Aug. 23, 1966  J. W. CRANE  3,267,839
AGRICULTURAL MACHINE
Filed March 1, 1965  4 Sheets-Sheet 1

INVENTOR.
JACK W. CRANE
BY
Joseph A. Brown
ATTORNEY

Aug. 23, 1966  J. W. CRANE  3,267,839
AGRICULTURAL MACHINE
Filed March 1, 1965  4 Sheets-Sheet 2

INVENTOR.
JACK W. CRANE
BY Joseph A. Brown
ATTORNEY

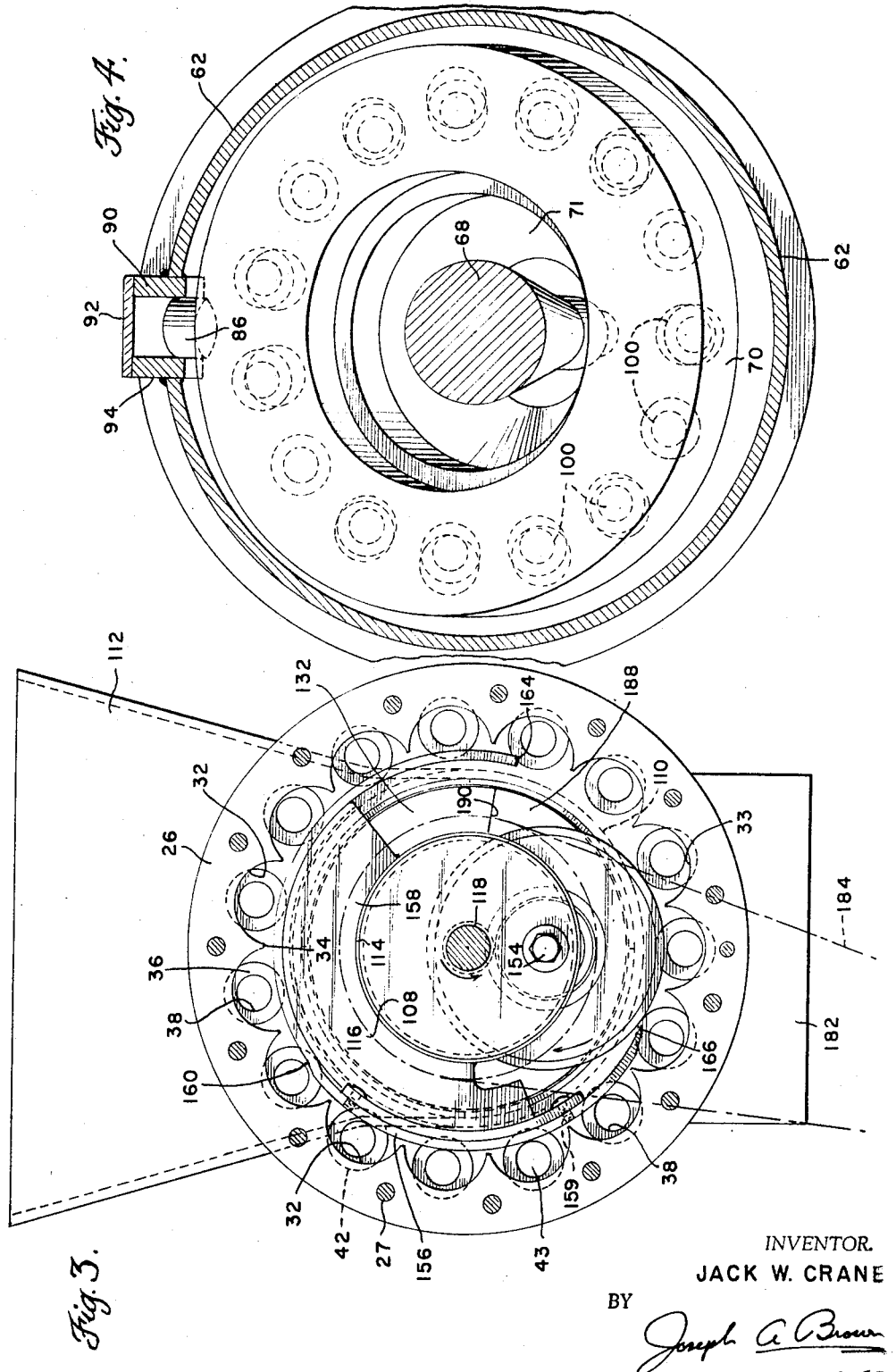

Aug. 23, 1966   J. W. CRANE   3,267,839
AGRICULTURAL MACHINE
Filed March 1, 1965   4 Sheets-Sheet 4

INVENTOR.
JACK W. CRANE
BY
*Joseph A. Brown*
ATTORNEY

United States Patent Office 3,267,839
Patented August 23, 1966

3,267,839
AGRICULTURAL MACHINE
Jack W. Crane, New Holland, Pa., assignor to Sperry Rand Corporation, New Holland, Pa., a corporation of Delaware
Filed Mar. 1, 1965, Ser. No. 435,861
30 Claims. (Cl. 100—139)

This invention relates generally to pelleting machines and more particularly to machines for the pelleting of long fibred crop material such as hay, alfalfa and the like commonly used for feeding stock animals. It is possible that the machine may be adapted to pelleting other material.

The machine of this invention is of the type comprised of an annular series of individualized reciprocating plunger units, composed each of but one die, one intervened material receiving cavity, and one coacting plunger, each unit producing but a single pellet per stroke of its plunger. The device is adapted to produce from long fibred crop material uniform pellets of desired shape, dimensions and physical properties. U.S. Patent No. 3,052,923 is an example of this general type of pelleting machine, but because of the design disclosed such machine is suitable mainly for the pelleting of powder-like, granular or desiccated material.

In attaining the objects of this invention, multistage compression of the crop material is utilized. The machine disclosed in this application is a three stage machine. An annular series of individualized reciprocating units is used to climax the material compression and constitutes its third stage. An auger mechanism affords the first stage, and an intervening roller mechanism constitutes the second stage. The intervened roller mechanism receives the material to be pelleted directly from the auger, and transfers it directly to the reciprocating mechanism. But it works upon the material during transfer in such manner as to place it before the plungers under a very substantial degree of precompression. It has been found that the combination of roller and reciprocating mechanism disclosed here results in a machine which produces superior quality pellets, yet has an acceptable weight and efficiency.

Substantial modifications and supplementations of each of the three types of mechanisms so combined have been necessary not only to effect the combination in the first place, but also to enable each mechanism to perform its function to best advantage and at best efficiency without detriment to the performance of the others. Outstanding of these modifications and supplementations are: the attainment of a three hundred and sixty degree cyclical sequential operation of the annular series of individualized reciprocating units by applying power commonly to plungers through a wobble plate and thus match a three hundred and sixty degree cycle of a roller mechanism; using one and the same die ring for each the reciprocating and the roller mechanisms; the opening of the mouths of the individualized material receiving cavities of the unit to occupy an entire periphery of the ring in which they are located and creating sharp edges where the cavity walls meet; providing means for retaining material in the cavities after it has been compressed therein; the coordination of the timing of the three hundred and sixty degree cyclical action of the roller mechanism with the timing of the reciprocating individualized units in such manner as to enable the roller mechanism to achieve maximum precompression of the material it presses into the receiving cavities without consequential interference from the plungers; the addition of a means to maintain the density of the precompressed material in the cavities until the advancing plungers have complete command of the material before them; provision of means to hold the material remaining in the cavities as the plungers are withdrawn not only from coming out but to hold it at a density as near as practicable to its original density of precompression; and the modification of the auger not only to admit the intervened roller mechanism but also to achieve precise pressing of its consolidated material within the limited angle of bite between the roller and the die ring compression cavities within which its delivery can be coordinated in time with the actions of both the roller and the reciprocating mechanisms. The details of all these means and yet others perhaps of not so great prominence are set forth in the following specification and shown in the accompanying drawings.

In the drawings:

FIG. 3 is a transverse section taken upon line 3—3 of FIG. 2 looking in the direction of the arrows;

FIG. 4 is a transaxial section taken generally on lines 4—4 of FIG. 2 looking in the direction of the arrows, both bearings of the wobble plate shown in FIG. 2 being omitted to better show the inner details of the hub and shaft;

FIG. 5 is a perspective view of the discharge end of the auger and precompression feeding mechanisms;

Figure 6:
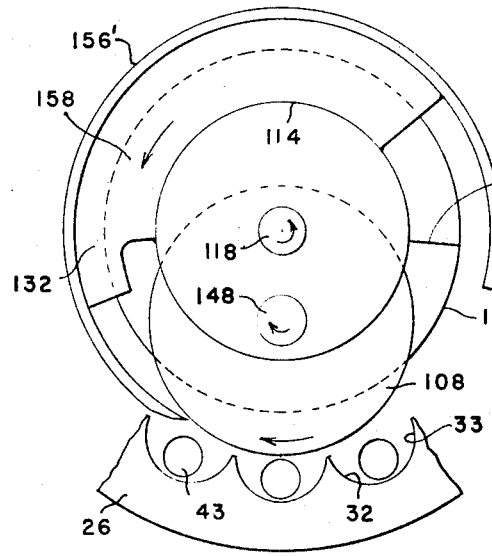
Figure 7:
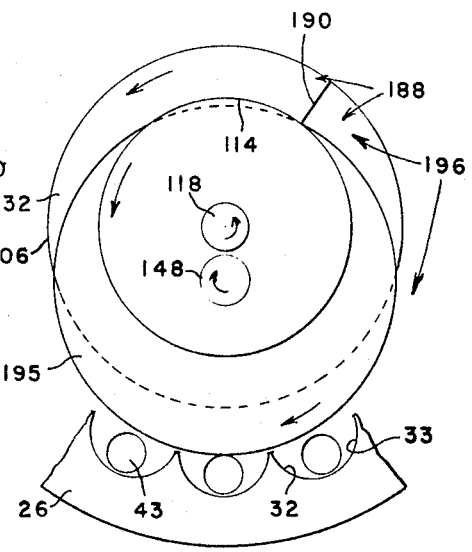
Figure 8:
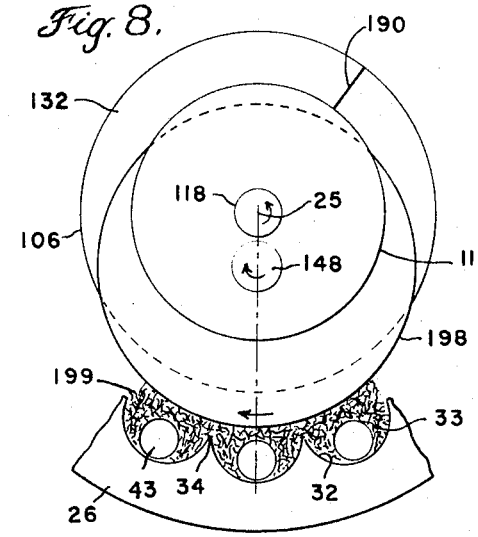
Figure 9:
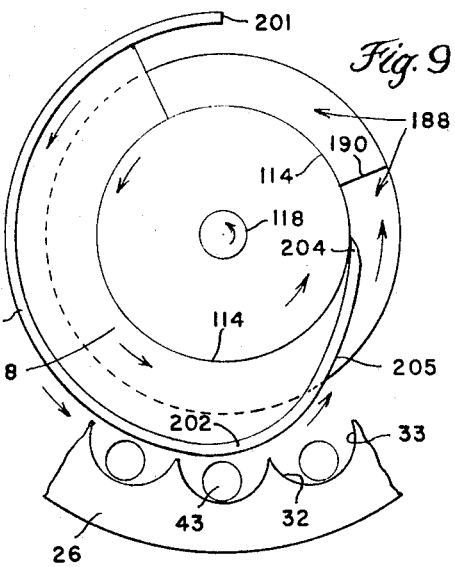
Figure 10:
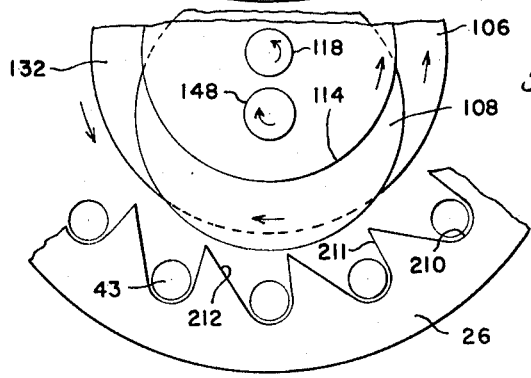

FIG. 6 diagrammatically illustrates the first of the several modifications, involving the principal elements appearing in FIG. 3; the modification is in the cover provided;

FIG. 7 is a view similar to FIG. 6 showing the use of a precompression roller of much enlarged diameter and the omission of the cavity cover;

FIG. 8 diagrammatically illustrates a modification of the form of FIG. 7 in which the large diameter of the precompression roller has been reduced sufficiently to space it appreciably from the inner periphery of the die ring;

FIG. 9 is a smaller diagrammatic view showing the omission of the precompression roller, and modifying the cavity cover in its fore portion to take the place of the roller; and FIG. 10 is a diagram showing quite a modification of the shape of the die ring cavities.

Referring now to the drawings by numerals of reference, and particularly to FIGS. 1–5, it will be noted that there are three mechanisms which coact with each other. The first mechanism to be described is the centrally located die ring, complete with its dies and coacting plungers and generally designated 20. The second is the wobble plate drive for the plungers, designated 22, and located on the right hand end of the machine. The third, which is designated 24, is located at the left hand end of the machine and denoting the infeed and precompression mechanism. This third mechanism achieves two compressions, an initial compression by an auger and the second by a roller mechanism built into the auger structure and coacting with the auger on the one hand and the die ring on the other.

The die ring per se of mechanism 20 comprises three members annular in form, namely a central member 26 which is axially wide and radially thick, and two side members 28 and 30 which constitute the side walls of the ring and in section are respectively axially narrow and radially long. These three members are fastened together by bolts 27 to constitute a rigid die ring unit.

Central member 26 has an annular series of material receiving cavities or chambers 32 transaxially of semicircular form, as clearly shown in FIG. 3. These cavities occupy the entire inner periphery 33 of the die ring member 26 and their walls meet in relatively sharp edges 34. The cavities extend the entire width of member 26 of the ring. At their ends, the cavities are closed and embraced by the side walls 28 and 30 of the ring, which project radially inwardly of member 26.

The pellet forming dies comprise mouth members and tubes, denoted 36 and 38, respectively. One complete die opens through wall 28 to each cavity 32, and collectively they constitute an annular series whose axes parallel the axis of the die ring. While this appears in FIG. 1 their construction is best shown in FIGS. 2 and 3. The mouth members 36 are rings, the body of the rings being of sharp rectangular cross-section as shown in FIG. 2. The rings are formed of hardened steel, and held in place by the pellet firming and curing tubes 38 associated with them. The inner tube ends are threaded into openings in the wall member 28 and bear against the outer faces of die mouth members 36 forcing them into alignment contact of their inner faces 42 provided on side walls of the main body 26 of the die ring. Elements 40 are also provided which project around cavities 32.

The plungers which force material from cavities 32, through mouth members 36 and into tubes 38 are denoted 43. It will be noted in FIG. 2 that the outside diameters of plungers 43 and the inside diameter of die mouths 36 and tubes 38 constitute an increasing series of dimensions, i.e., die mouth 36 has a slightly larger diameter than plunger 43, and tube 38 has a slightly larger diameter than die mouth 36. Between each member 36 and tube 38 a shoulder 41 is formed which resists expansion of material from the tube and toward its associated die cavity.

The plungers 43 are elongated; they are in an annular series in axial alignment with the die tubes 38 and like them paralleling the axis 25 of the die ring. About this axis the entire machine is built. The plungers are of uniform diameter.

A cylindrical housing 44 furnishes bearing support for plungers 43. This housing is provided with a radially re-entrant portion 46 which has a welded and gusseted connection with the die ring. Housing 44 is centered about axis 25 against an annular shoulder 48 on side wall 30 of the ring. The thicker section of the housing is provided with an annular series of bores 50, one for each plunger 43 and of a diameter considerably greater than the plungers. Spaced bearings 52 and 54 are fitted respectively into the opposite ends of the bores 50. Intermediate the bearings, oil receiving spaces are formed about the plungers. Oil sealing rings 56 are secured about the exposed portions of the plungers which surround the walls of the housing, being connected by bolts 55 to the face of the housing 44 just outside of bearing 52.

Each plunger has a removable and replaceable material engaging end 58 secured in place by a through running bolt 59, as shown in FIG. 2. The removable ends 58 of the plungers, like the mouths 36 of the dies 38, are formed of tempered steel and have sharp working edges, whereby material compressed between them will be clearly cut as it is forced into the dies.

Aligning bearings 60 are provided for the ends of the plungers. These bearings are located in ring side wall 30. The plungers are projected through these bearings in the side wall 30 into and through the cavities 32 into coaction with the die mouths 36. As can be seen from the dotted lines showing in the upper parts of each of FIGS. 1 and 2, plungers 43 at the extremity of their compression stroke actually enter the die members 36, 38. To the end of avoiding possible engagement of plunger ends 58 with members 36, the inside diameter of die members 36 is made sufficiently over size so as to provide reasonable clearance for entering plunger ends without interfering with the proper material shearing action.

A second housing 62, all portions of which are largely of circular cross section as appears in FIG. 4, has a bolted on connection with housing 44. Housing 62 contains the plunger operating wobble plate 70, its connection with the plungers, and the main body of the main drive shaft 64 of the machine. This drive shaft is comprised of a power receiving section 66 whose center line coincides with the axis 25 of the die ring, and an offset portion 68 whose axis intersects the axis at a substantial angle. Both portions are tapered. The wobble plate 70 has a tapered hub 71. Tapered roller bearings 72 and 73 are provided whose inner and outer faces, respectively, are fixed against shoulders on the hub 71 and shaft portion 68. They are held in place by a nut 74 threaded onto the extremity of the tapered offset section 68 of the power shaft 64.

Figure 1:
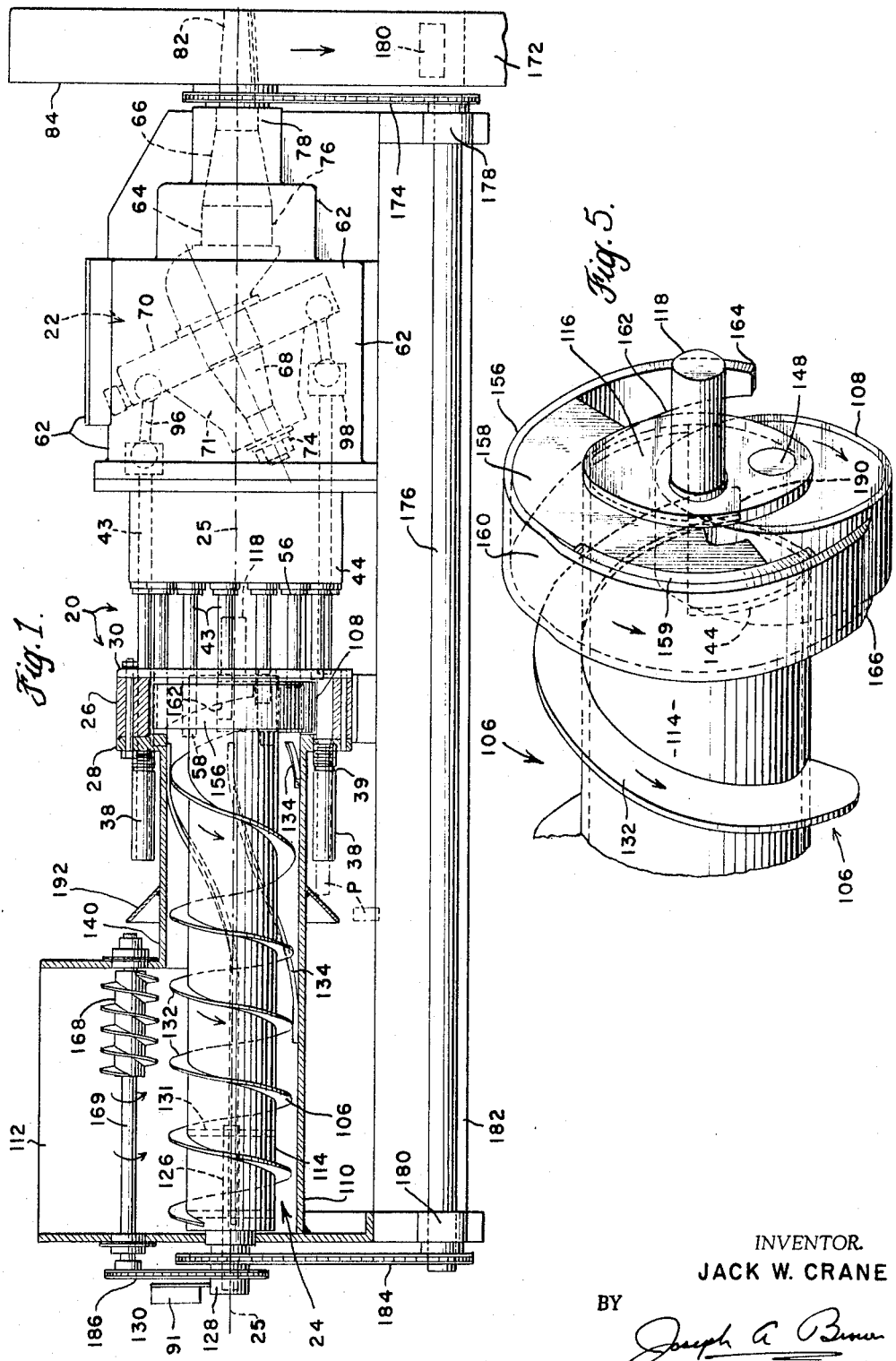
FIG. 1 shows the pelleting machine of this invention as a whole, the right hand half of the machine being shown in side elevation and the left hand half in vertical section up to and through the center of the machine.
Figure 2:
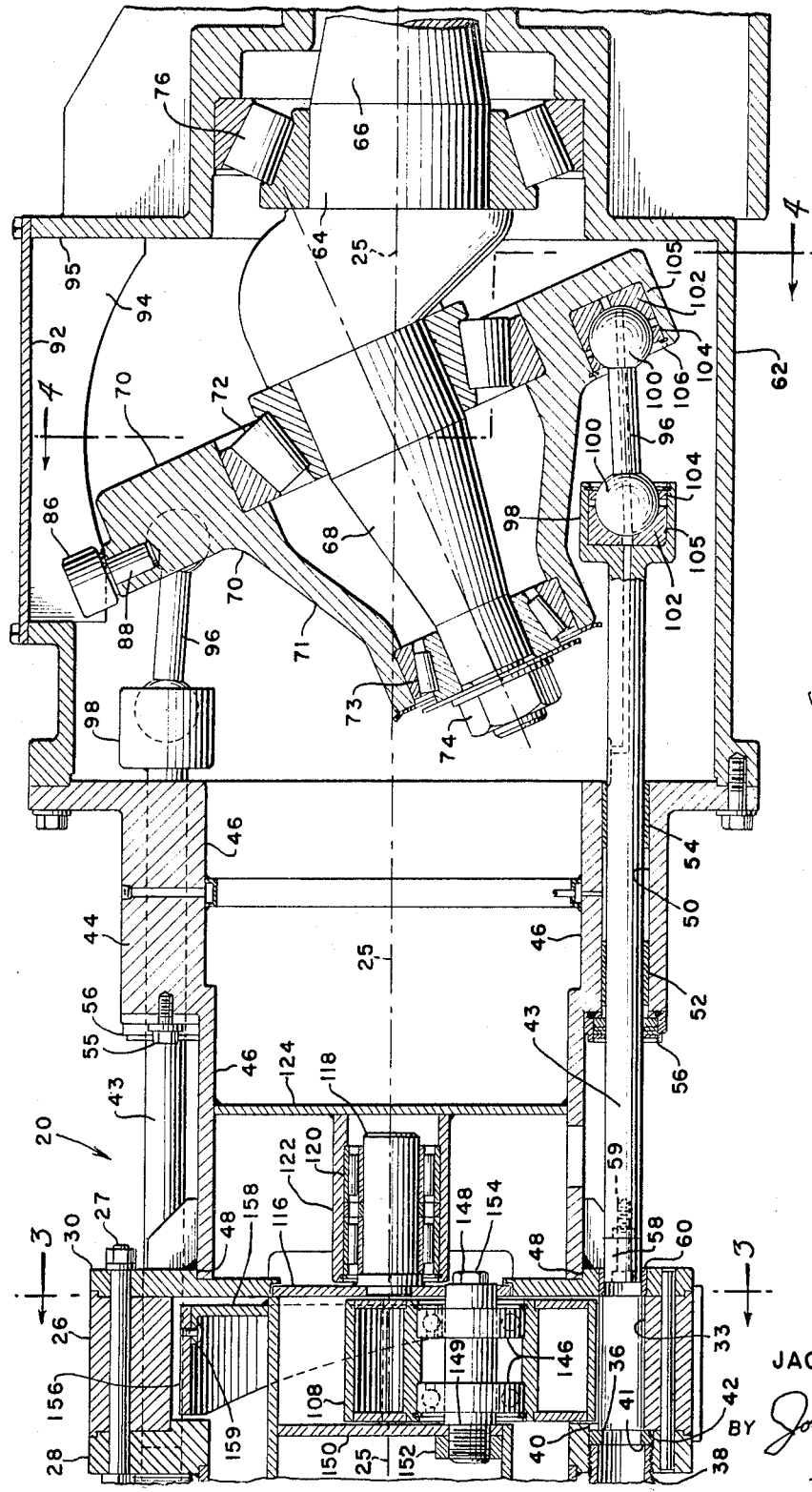
FIG. 2 is an enlarged longitudinal vertical section of the machine showing the die ring, the pellet forming plungers and the drive therefor.

In FIG. 1, 76 and 78 mark the locations of similarly located and fixed roller bearings of the elongated power receiving section 66 of the shaft 64. The inboard bearing 76 is shown in FIG. 2. Shaft 64 has an outwardly projecting end 82 on which a flywheel pulley 84 is mounted.

Secure to the periphery of wobble plate 70 is an antifriction roller 86 and its mounting shaft 88. Shaft 88 extends radially and is rigidly secured to the wobble plate in any suitable manner, while the roller rotates about the shaft. Members 90, 92 and 94 collectively form an axially extending guide channel for roller 86. The channel ends are closed by end walls 95. As can be seen in FIG. 4 the roller guiding side walls 90 and 94 are extended downwardly inside the walls of housing 62. Their lower edges of the sides are arc shaped concentric to the path of the lower edges of antifriction roller 86. Walls 90, 94 and roller 86 fix the wobble plate 70 against rotation and cause it to oscillate and carry the roller with it when driven by shaft 64 and section 68. Side walls 90, 94 are welded in place as shown in FIG. 4, and top wall 92 is bolted in place, as shown in FIG. 2, and thereby made removable for access to roller 86 and the interior of the casing 62.

Wobble plate 70 is connected to plungers 43 by an annularly disposed set of connecting rods 96 having ball and socket connections with enlarged rear ends 98 of plungers 43 on the one hand and the adjacent side of the wobble plate 70 on the other. These ball and socket connections comprise true and hardened steel balls 100, one tightly threaded and locked on each end of each connecting rod, and inner and outer socket members 102, 104 of sintered metal conforming to the spherical shape of the balls. These sockets are close fitted within pockets 105 formed respectively in the plunger ends 98 and the wobble plate. Snap rings 106 seated in appropriate slots hold the socket members in place about the balls 100.

The mechanism 24 for precompressing and delivering the crop material to the cavities 32 of the ring die, comprises an auger 106 having a precompression roller 108 built onto and into the auger discharge end. Both units of this mechanism revolve about the projected axis 25 of the die ring. They operate within a cylindrical infeed chamber 110 having integral connection by welding or otherwise with the left hand side wall 28 of the die ring and centered on the axis 25 of the ring. Chamber 110 completely surrounds auger 106 from the die ring outwardly, but for an opening at the top to connect with hopper 112 through which crop material is fed into the machine.

The main body of the auger is a hollow cylinder 114 of relatively heavy plate material, as can be seen in FIGS. 3 and 5 to which reference should now be made. The body 114 extends the full length of chamber 110 and at the right hand end actually enters the die ring through side wall 28 to enable the percompression roller 108 to be located in the die ring, there to coact with both the auger and the die ring. This end of auger body 114 is closed by a head member 116 welded or otherwise secured in place. Strongly secured to head member 116 is a stub shaft 118. As shown in FIG. 2, an antifriction bearing support and journal 120 is provided for chamber 110 within section 46 of the plunger housing 44 to the right of the die ring. Journal 120 is carried in a bearing casing 122 welded in transaxial diaphragm 124. At the opposite end, auger 106 has a corresponding stub shaft 126 (FIG. 1) borne by a journal housing 128 welded or otherwise secured to the outer wall 130 of chamber 110. Shaft 126 projects outwardly a distance beyond journal 128, and it is rigidly connected at its opposite end inside the main body 114 of the auger by welding or otherwise, to transverse plates 131 which are in turn welded to the inside wall of the body 114. Note the dotted line showings in FIG. 1.

Auger 106 has flights 132 and cooperative therewith are four lengths of stationery stripping ribs 134 borne by chamber 110 and spaced ninety degrees apart. The ribs coact with the flights 132. The auger flights 132 in the region of the loose material below the hopper, and slightly beyond it, are of relatively low pitch and the distance between them is substantially uniform. In the next region to the side wall 28 of the die ring, the pitch of the flights 132 is gradually increased, ultimately to become almost twice as great as in the region of the hopper 112. It is understood that the term "low pitch" as used herein refers to a relatively close spacing of adjacent auger flights, and that the term "high pitch" refers to a relatively wide spacing of adjacent auger flights. The strippers 134 lie in close proximity to the outer edges of the auger flight and run substantially parallel to the axis 25 where the auger has flights of low pitch. Shortly before the flight pitch begins to increase these strippers are turned in the direction of the auger rotation increasingly as the flight pitch increases, thereby to coact with the portion of the increased pitch to shift and drift the feed material annularly and axially precisely to the region of delivery desired.

The precompression roller 108 is journalled, as shown in FIG. 2. The roller is shown as being made up of welded steel plate affording it a hollow cross section; it may, however, be of other construction. The diameter of roller 108 is greater than the radius of auger 106. The roller projects radially outwardly of chamber 110 and beyond the inside diameter of the side wall 28 of the ring die. The body 114 of the auger is cut away at 144 (FIG. 5) to permit the roller 108 to be placed so that it may rotate and revolve near to tangency with the inner periphery 33 of the die ring. Antifriction bearings 146 built into the cylindrical body 114 of the auger hold the roller in the position described for revolution with the auger about the ring axis 25 and rotation about the axis of the roller itself. The bearings 146 are maintained fixed in relation to the axis of revolution 25 by passing a shouldered bolt 148 through an aperture in the head 116 of the auger on the one hand, and its shouldered opposite end 149 through a diaphragm plate 150 secured to the interior wall of the body 114 just inside of the cut away portion 144. Interengaged threads on the inside of the aperture in diaphragm 150 and a reinforcing block 152 and a hexagonal head 154 on the opposite end of the stud member 148 enables one to tighten shoulder 149 securely to the inner face of member 150.

There is a cover member 156 for the cavities 32, which like the roller 108 is mounted upon and revolves with the auger body 114. The mounting is by means of a radially extending plate segment 158 whose inner edge is welded to the body 114 of the auger just inside of the plane of head 116. Segment 158 is provided with the flanged outer edge 159 to which the cover 156 is riveted or bolted (see FIG. 2). As clearly appears in each of FIGS. 2, 3 and 5 this cover member is but slightly less in radius than the inner periphery of the die ring throughout about half its extent, that is to say up to a point such as 160. The remainder of the ring is of smaller radius and its inner edge 162 tapers to the cover terminus 164. Its opposite end 166 is sharpened and extends into very close proximity to the outer periphery of roller 108. Its width is slightly less than that of the roller rim. The entire extent of the cover member is in the neighborhood of two hundred and seventy degrees. Its supporting member 158 however, is slightly less than one hundred and eighty degrees in extent. End 166 strips material from roller 108 and keeps it clean.

As will be noted best in FIG. 5, cover 156 is mounted on auger 106 in a location opposite to roller 108 and its center of gravity. The weight of the cover counterbalances in part the weight of the roller and vibrations of the machine, related to the infeed of material, are minimized.

Within hopper 112 is a short auger 168 having a shaft 169. Shaft 169 is carried on bearings supported by end walls of the hopper. Its function is to regulate the feeding of material to the main auger and to prevent clogging.

The machine is designed to receive its power by belt transmission from an adequate source, such as an internal combustion engine, not shown, having belt 172 (FIG. 1) running over pulley 84. V-belts are preferred. This pulley 84, as heretofore indicated, revolves the wobble plate power shaft 64 which through its offset inside end 68 causes the wobble plate 70 to wobble back and forth once for each revolution of the shaft, and in succession carry each of the plungers 43 with which the wobble plate connects through a three hundred and sixty degree cycle of an approximate sine curve motion A chain and sprocket 174 connects pulley end 66 to a long shaft 176 having journals 178, 180 upon chassis frame 182 or other foundation members upon which the machine is mounted. Shaft 176 transmits power to the auger mechanism 106 and roller mechanism 108, through chain and sprocket connection 184, on a one to one basis to the shaft 126 of the outer end of the auger 106. An auxiliary chain and sprocket connection 186 transmits power to the hopper auger 168 but at a high speed.

In the movements of wobble plate 70, vibrations and forces are created which are counterbalanced by counterweights 180 and 91. Weight 180 is carried on pulley 84 and weight 91 on the drive to auger 106. Weights 180 and 91 produce a couple which is substantially equal and out of phase with the unbalanced forces of the wobble plate. One largely cancels out the other to produce a smooth operating machine.

OPERATION

The engine which drives the machine is started and the moving components are brought up to operating speed. Then loose crop material such as hay, alfalfa or the like to be pelleted is fed into the hopper 112 in any chosen manner. Preferably the material is chopped into lengths from one to three inches before feeding. The material in the hopper is immediately withdrawn by the flights 132 of auger 106 and rapidly conveyed and simultaneously consolidated to considerably less volume. The auger borne material is moved toward the die ring and discharged from the terminal end 190 of the auger flighting into the space 188 (FIG. 3) between the die ring and the precompression roller 108. Through the rapidly increasing pitch of the auger flight and the coacting angularly and forwardly diverted strippers 134 the material is directed and delivered with precision. This space 188 lies between the tapered end portion 162 of the cavity cover 156, the inner periphery 33 of the die ring, and the outer periphery of roller 108. Space 188 occupies an angle of between forty-five and ninety degrees. Terminal end 190 of the auger flights as shown in dotted lines in FIG. 5, and in full lines in FIG. 3, is near the middle of this space. The material delivered by the auger into this space is precompressed therein to a moderate degree by the end 190 of auger flights, then to be seized upon by the periphery of the clockwise rotating roller 108 and precompressed to a considerably higher degree as it is forced into the ring die cavities 32 in succession as the roller reaches them in its rotation about axis 25.

If the cavities are entirely empty at the start, maximum precompression by the roller 108 is not reached until after the first revolution or two has taken place. The plungers 43 in their operation thereafter compress, shear off, and force out of the cavities, and extrude through the dies 38 much more highly compressed slugs of material of the diameter of each die mouth 36, leaving a remainder of roller compressed material within the cavities. This remainder during the next revolution or two of the roller reacts against the admission of the following auger flow delivered to the space 188, thus raising the levels of the precompressive pressure appreciably for both the auger and the roller. The flow from the auger to space 188 is generally uniform and continuous provided hopper 112 is kept supplied with material. The revolving and rotating roller 108 is then able to operate at high efficiency in replacing the material removed from the cavities by plungers 43. The new charges push the material remaining in the cavities along the inclined side walls of the cavities to densely fill the voids left by the plungers, so establishing in each cavity a uniformly dense mass of material upon which its associated plunger can act.

Preservation of this uniformity is furthered by the cover plate 156 revolving with the roller 108, which makes a close contact with the material in the cavities 32 until the plungers 43 take complete charge of the hay compressed between them and the mouths 36 of the dies, to or near the point of the shearing of the compressed slugs. Then the pressure on the remainder is relieved by the decreased radius of the cover member 156 at the point 160, and shortly thereafter by the gradually narrowing margin 162 as the terminus 164 is approached. This decreases the friction load without releasing the remainder material, until the new charge is placed within space 188 and the roller 108 takes command of it and the remainder material together.

The progressive withdrawal of the plungers 43 is shown in FIG. 1 where the dotted-in ends 58 of the withdrawing plungers 43 are shown in their relation to the tapered portion 162 of the cover 156. In each position they extend a substantial distance beyond the tapered portion and so progressively supersede the margin in holding in the remainder material. Here it is that we find maximum coaction and coordination in timing between the auger mechanism 106 with its precision delivery brought about as stated by the rapid increase in the pitch of the flights 132 and accompanying angular change in direction of the strippers 134 on the one hand, and the roller 108 and the reciprocating mechanism with its plungers 43 on the other. The auger mechanism 106 achieves its maximum precompression just before the roller 108 achieves its maximum, and the final compression is then achieved to the highest degree by the plungers. It is advantageous to have the plungers successively pass across the cavities 32 just before maximum compression is reached in each successive cavity but not so early as to interfere with the uniformity of density being achieved by roller 108.

It is in the efficient coaction between the roller 108 and the plungers 43 that this invention has greatest advantage. The motion of the plungers follows a simple harmonic generally sine curve. The plungers move rapidly followed by a gradual decrease of motion as the peak pressure suddenly rises to a maximum, falls slightly, then as suddenly falls to a minimum as the plungers force the pellet column out of its confining tube 38. The emerging pellets are shown at P in FIG. 1. Each column travels into contact with a conical break-off ring 192 and plunger withdrawal begins. Due to the uniformity and the height of density achieved in the cavities through the coacting of auger, roller and cavity cover as described, the plungers in their motion push out on each stroke pellets not only of uniform diameter but of decidedly more uniform length. The angular disposition of wobble plate 70 and the stroke of the plungers which results from it, and the relation of that stroke to the dies 38 is made such as to establish the extreme of stroke in which, when a plunger is completely withdrawn from its cavity, its end 58 stops about one half inch within the bounds of the bearing 60 (FIG. 2). When fully extended, end 58 enters its die 36, 38 to a depth of between one and two inches. This extra inch or two of overtravel creates an open air space in the die after the plunger leaves which results in a body of compressed air when the next pellet slug is forced through the die mouth 36. This air is at first compressed but then escapes as the plunger enters, by blowing through the clearance space provided between the die mouth and the plunger body, so keeping the die mouth clear, but not before it has the effect of accentuating the separating surfaces between the adjoining heads of the pellet slugs, so furthering uniformity of length of pellets.

Here should be noted also the effect of the increased inside diameter of the die tube 38 over the inside diameter of the mouth 36. The increase permits a small expansion of slug diameter as the slug passes through the mouth into the tube, and the shoulder between mouth 36 and tube 38 prevents backward flow of the material as it expands. The shoulder also tends to keep the end portion of the plunger cleaner by pushing off material adhering to the plunger when the plunger retracts.

Pellets of hay produced by this machine have a diameter of about an inch and a quarter and a length of about one inch. The circular cross-section of each die mouth 36 and tube 38 produces pellets having a hardened exterior cylindrical surface of great uniformity and smoothness, with the result that the pellets flow very readily along feed troughs and through large diameter feed pipes. As against pellets of cubical form which have six exposed faces, the cylindrical pellets produced by this machine have only two flat faces which may inter-engage and impede flow. The pellets have no sharp points; and as against cubical pellets each have eight sharp points; and as against twelve edges on cubical pellets, the pellets produced here have only a cylindrical body and two circumferential end edges. These characteristics provide increased ease of flow and also make the pellets more agreeable to the animals being fed. Finally, the cylindrical form of the pellets produced affords more free space and more uniformly distributed space for the circulation of air, thus facilitating drying and decreasing danger of spoilage from mold.

A further advantage realized by this machine has to do with the distribution of power loads and their uniformity as so distributed. This applies to each moving element of the machine all the way through from power shaft and wobble plate to the auger at the input end of the machine. The power load on the wobble plate is uniform by reason of the multiple number of plungers in operation. The division of this load between the plungers minimizes individual plunger and connecting rod loads and enables the keeping of bearing pressure down. Provision of large and axially widely spaced bearings for both the input power shaft and the wobble plate keeps these bearing pressures within bounds, even though there exists constantly between one side of the wobble plate and the dies 36, 38 a revolving force couple. This is resolved in the rigidly interconnected housing members and the die ring and the counter couple provided by weights 190 and 191. Made of heavy castings or welded plate and of circular section the housings and die ring constitute a cylindrical column adapted to forces developed, for it is equally effective for all planes the couple occupies in revolution. Members of the chassis frame 182 or any other foundation upon which the machine is mounted may be considered as supplementing the housing.

The invention thus described is susceptible to modification of any or all its parts without departing from its generic spirit. By way of example, there are illustrated diagrammatically in FIGS. 6 to 10 several modifications of the auger 106, roller 108, cavities cover 156, and die ring 26, and their relationships to each other.

FIG. 6 illustrates a cavities cover member 156' which has been modified by making it of uniform radius throughout, thereby having the same frictional contact with the charges of hay in the cavities 32 throughout the extent of the cover, and thereby increasing the power load. Nevertheless there will be somewhat less friction in the after portion of the cover than in the fore portion since the plungers are being withdrawn in this region and the cavities pressures are lessened until they begin to receive a fresh charge of material.

In FIG. 7 a roller denoted 195 is given a very much larger diameter than roller 108, a diameter so great as to enable the roller itself to substantially provide cover enough for at least the three cavities 32 illustrated. In such case and with an appropriate adjustment of timing, the cover plate 156 may be omitted. With such an enlarged roller the pressure level in the cavities can be placed and held at a considerably higher level, a level high enough to hold the remainder of the material without the use of the cover plate. With the larger diameter roller 195 the precompression is greater, the space 196 into which the material is delivered by auger flights 132 is moved back as indicated and the plunger timing so retarded that the presence of the forepart of a plunger within the remainder of the material serves to hold the remainder from displacement during withdrawal. But more importantly the plungers lead enough in the forward stroke to take over the new charge before roller 195 releases its command.

FIG. 8 shows the parts in the same relationship as FIG. 7 except that the diameter of the roller 198 is slightly less than that in FIG. 7. It has been decreased sufficiently to form and constantly maintain an annular mat of material 199, between the roller and the meeting edges 34 of the cavities 32. Such a mat is continuous and will retain the remainder of the hay in the cavities inasmuch as its fibers extend across the sharp edges formed by the walls of the cavities as they meet and are not cut through as are the fibers which overlap these sharp meeting edges in preceding forms. Provision of this feature constitutes yet another means of retaining remainder material when the cover plate 156 is omitted, the first means being the presence of the withdrawing ends of the plungers and the second being the higher degree of compression reachable with rollers of larger diameter.

FIG. 9 shows diagrammed a cover plate 200 construction which enables the elimination of a compression roller. It falls short of reaching the highest densities, efficiency, and thorough going coaction reachable through use of the roller 108 in combination with a cover plate. In this form the plate 200 is made of uniform radius through substantially one hundred and eighty degrees from its trailing end 201, thereby keeping the cavities closed throughout that range. The leading ninety degrees of cover 200 however, is bent on a gentle arc 202 gradually inwardly until its sharpened end 204 contacts or substantially contacts the outer surface of the auger cylinder 114. Inasmuch as the roller is omitted in this case, the outer surface of the auger cylinder is unbroken and the material delivered by the auger to the space 188 is caught up by the gently curved end 205 of the member 200 and pressed into the cavities.

FIG. 10 illustrates modifications of the die ring itself. Its cavities 210 instead of being centered on a radius as are those illustrated in the previous figures, are asymmetrical with respect to the radius of the ring. The bottoms of the cavities are centered on the plunger axes and lie near to the bodies of the plungers while one of their side walls 211 rises steeply and the other 212 gradually. Both are drifted counter to the direction of revolution of the roller 108 with which they cooperate. This construction of the cavities brings the cavity walls into more efficient coaction with the plungers and endows the rollers with a substantial component of charging force in the direction of its revolution. If the cavities are not too deep, the remainder of material after the extrusion charge has been pushed out may prove to be less. However, the deeper the cavity the steeper may be the side walls and there results less resistance to reception of the new charge.

While this invention has been described in connection with several embodiments thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A three stage material compression and pellet forming machine comprising a die ring having interior and exterior peripheries and side walls, material receiving cavities embraced by the side walls and open on one periphery for the receipt of infed material to be pelleted, an annular series of pellet forming dies opening into the cavities from one side wall of the ring, a corresponding series of material compressing plungers entering into the cavities from the other side wall in axial alignment with the dies, material receiving and precompressing means coacting with the cavity openings periphery of the die ring to cylically compress into the cavities material fed thereto, an initial precompressing means receiving loose material and feeding it under an initial compression to the aforesaid precompressing means, said initial precompressing means acting at an angle to said material receiving and precompressing means, and means for cyclically operating said plungers across the cavities to the dies in timed relationship to said precompressing means whereby said material already twice precompressed in finally compressed and forced through the dies in pellet form.

2. A machine according to claim 1 in which the first named precompression means is a roller mounted to be rotated on its own axis in substantially tangency to the cavities of said one open periphery of the die ring, and said roller on one hand, and said die ring, dies and plungers on the other hand, being relatively rotatable about the axis of the die ring.

3. A machine according to claim 1 in which the aforesaid initial precompressing means is an auger rotating upon the same axis as the axis of the die ring.

4. A machine according to claim 1 in which the means for driving the plungers is a wobble plate.

5. A machine according to claim 1 in which means is operatively related to the first named precompressing means to hold the precompressed material in the cavities during its final compression and extrusion from the dies by said plungers.

6. A machine according to claim 1 in which said initial compressing means is an auger rotatable about the ring axis, and the means for driving said plungers is a connecting wobble plate, which material compressing components being cyclically timed to successively compress the material, the auger first, the roller second, and the wobble plate and connected plungers third.

7. A machine according to claim 1 in which the said die ring cavities and dies are stationary and the remaining elements move with respect to the ring, and stationary housing members rigidly connected to and projecting from the opposite sides of said stationary die ring which together with the die ring encase substantially in entirety all parts of said moving elements, provide support for bearings thereof, and constitute collectively a rigid framework for the machine.

8. A multistage material compressing and pelleting machine comprising a die ring having inner and outer peripheries and intervening side walls, an annular series of material receiving cavities within said ring encompassed by the side walls and one periphery of the ring and having mouths open to receive material to be pelleted, which mouths collectively span substantially the entire circumference of said one periphery, a corresponding annular series of pellet shaping dies opening into the cavities through one side wall thereof, a coacting series of material compressing and extruding plungers entering the cavities from the other side wall thereof, material receiving and precompressing means coacting with the cavities open periphery of the ring to feed and compress into the cavities material fed to it, means for relatively revolving said precompressing means and said ring with its dies and plungers about a common axis, and means for cyclically operating said plungers in timed relationship to said precompressing means.

9. A pelleting machine according to claim 8 in which the contiguous cavities are each of a shape widest at its mouth and symmetrical with respect to a radius line of the ring.

10. A pelleting machine according to claim 8 in which each of the cavities is asymmetrical with respect to any radius of the ring and whose maximum depth is sloped and drifted in the relative direction of revolution of the material precompressing means.

11. A pelleting machine comprising a die ring equipped with an annular series of pellet shaping dies through which pelleting material may be forced, means coacting with the dies in annular progression for forcing material through them, and an auger mechanism delivering the material to be acted upon within the die ring, the flights of said auger mechanism being of low pitch in a portion remote from the ring which initially engages loose material, and of high pitch in a portion adjacent the die ring, and having flight stripping members substantially parallel to the axis of the auger mechanism in the portion of its low pitch and at an angle to its axis and extending in the direction of rotation in the portion of high pitch, whereby the material being delivered is moved simultaneously annularly and axially.

12. A pelleting machine comprising a die ring having an annular series of material receiving cavities equipped with an annular series of pellet shaping dies and a coacting annular series of material compressing and pellet extruding plungers, means delivering within the ring and in the paths of movement of said plungers material to be pelleted, and means for cyclically operating said plungers comprising a wobble plate having operating connection with said plungers, a housing surrounding said wobble plate, channel means on said housing, roll means on said wobble plate and slidably received within said channel means for fixing said wobble plate against rotation but allowing it to wobble, and a power shaft mounting and driving the wobble plate, said power shaft having a power receiving portion whose axis is in alignment with the axis of the die ring, and a wobble plate bearing portion extending toward the ring and whose bearing axis lies in the same plane as the axis of the ring and at an angle to it.

13. A pelleting machine according to claim 12 in which said drive shaft portion and the wobble plate are balanced about a point lying on the axis of the die ring.

14. A pelleting machine comprising a die ring having an annular series of pelleting material receiving cavities opening upon one periphery thereof, an annular series of pellet shaping dies mounted along one side of the ring and opening to said cavities, an annular series of material compressing and extruding plungers entering said cavities from the opposite sides of said ring and coacting with the dies, a material receiving and precompressing roller rotatable about its own axis in substantial tangency to the cavities open periphery of the die ring, means for imparting a relative motion of revolution about the axis of the die ring, of the die ring, dies, and plungers on the one hand, and said roller on the other, and means for cyclically operating said plungers in timed relationship to said relative motion of revolution of the die ring and roller.

15. A machine according to claim 14 in which the material is fed to the roller by an auger journalled on the oppositely projected axis of the die ring and driven in synchronism with the roller.

16. A machine according to claim 14 wherein an arcuate cover is provided for said cavities extending rearwardly closely behind said roller through a limited angle and having the same motion of revolution.

17. A machine according to claim 16 in which said arcuate cover covers the cavities more thoroughly in its forward portion than in its after portion.

18. A machine according to claim 16 in which the cover and its mounting have a center of gravity lying on the opposite side of said auger from the center of gravity of the roller and its mounting and have such weight as to counterbalance at least in part the weight of said roller whereby vibration due to imbalance of the roller mechanism's weight is minimized.

19. A material compressing and pelleting machine comprising a die ring having an annular series of material receiving cavities in its body, the centers of which cavities lie in one and the same transaxial plane and are provided with open mouths on one radial side of the axial cross section of the ring, an annular series of pellet shaping dies and an annular series coacting plungers connected with said ring and having access respectively to and through said cavities from opposite lateral sides thereof, means for operating said plungers in an annular succession, rotatable roller means coacting with the open mouths of said cavities to receive and compress into the cavities material delivered between it and the cavity mouths, and means for relatively revolving said rotatable roller means on the one hand, and the remaining pelleting elements on the other hand.

20. A material comprising and pelleting machine as recited in claim 19 wherein means is provided in said cavities to retard movement of material radially outwardly of the cavities after the material has been compressed into the cavities.

21. A material compressing and pelleting machine comprising a die ring having an annular series of material receiving cavities in its body, the centers of which cavities lie in one and the same transaxial plane, which cavities are provided with open mouths on one radial side of the axial cross section of the ring, an annular series of pellet shaping dies and an annular series of coacting plungers connected with said ring and having respectively access to and through said cavities from opposite lateral sides thereof, means coacting with the open mouths of the cavities in annular succession to receive and precompress into the cavities material delivered between it and the cavity mouths, a wobble plate driving said plungers in annular succession in timed relationship to said material receiving and precompression means, and means for relatively revolving said receiving and precompression means on the one hand, and the remainder of the specified elements on the other hand.

22. A pelleting machine comprising a die mounting ring having an annular series of pelleting material receiving cavities open on one side of its body for the entrance of the material, a corresponding annular series of pellet shaping dies, and coacting, aligned, reciprocating plungers respectively opening into and entering said cavities from axially opposite ends thereof, rotatable roller means relatively revolvable about the ring axis in a three hundred sixty degree cycle close to the mouths of the cavities and coacting with the axially extending walls of the cavities to precompress material placed before it into said cavities to charge the cavities, wobble plate means operating said plungers upon a corresponding three hundred sixty degree cycle which, for each individual die and plunger, emanates substantially at the point of maximum precompression of the charge within its associated cavity, an arcuate cavity covering plate fitting close to the mouths of the cavities, and mounted to revolve about the ring axis in synchronism into and closely following the roller means, and having a terminal end adjacent the point where the roller means comes closest to said receiving cavities, and an auger feeding said roller means and having a material delivering end radially opposite the terminus of said cover plate.

23. A machine according to claim 22 in which the cover plate margin next to the auger is tapered and narrowed from a point one hundred eighty degrees from the point of maximum compression of the roller to the terminus of the cover plate, and the wobble plate establishing a length of plunger stroke affording a degree of overtravel within the die that the plunger ends project a substantial distance beyond the tapered margin of the cover plate, the withdrawing plungers aiding this portion of the plate in retaining the material remaining in the cavities under a measure of precompression until the roller mechanism commences to push in the next charge of material.

24. A device for pelleting crop material as recited in claim 23 wherein means is provided on said device for breaking off pellets as they travel from said dies.

25. A device for pelleting crop material comprising a support frame, a die ring supported on said frame, said die ring having an interior and exterior periphery and side walls, material receiving arcuate cavities in said die ring embraced by said side walls and open on said interior periphery for the receipt of material to be pelleted delivered radially outwardly relative to the ring axis, an annular series of tubular pellet forming dies having ends communicating with said cavities from one side wall of said ring, a corresponding series of material compressing plungers located along said other side wall of said ring and also communicating with said cavities, said dies and plungers being aligned with each other and having axes parallel to said axis of the die ring, said plungers having working ends movable through said cavities from locations adjacent said other side wall, across said die ring to said one side wall and then into said dies, drive means located on the same side of said die ring as said plungers for reciprocating the plungers, an infeed chamber mounted on the opposite side of said die ring, an auger rotatable in said chamber, a hopper through which material is deposited in said chamber, means for rotating said auger whereby material is conveyed through said chamber and into said die ring, and means within said die ring and revolvable relative to the die ring to force material delivered by the auger radially outwardly and into said die ring cavities.

26. A device for pelleting crop material as recited in claim 25 wherein said drive means for reciprocating said plungers comprises means for cyclically moving the plungers on working strokes, said plungers moving across said die ring in succession one after the other.

27. A device for pelleting crop material as recited in claim 26 wherein said plunger drive means comprises a wobble plate.

28. A device for pelleting crop material as recited in claim 27 wherein counterweights are provided in operative relation to said auger rotating means and said wobble plate to balance the movements of said plate.

29. A device for pelleting crop material as recited in claim 27 wherein means is provided fixing said wobble plate against rotation but leaving it free to wobble.

30. A device for pelleting crop material as recited in claim 25 wherein said means for forcing material radially outwardly has a portion which projects between said side walls of said die ring and revolves relative to the ring, said material forcing means being carried on said auger and revolved in timed relation with the cyclical movement of said plungers whereby a given plunger moving across one of said die cavities has the material forcing means adjacent to it.

References Cited by the Examiner

UNITED STATES PATENTS

| | | |
|---|---|---|
| 657,607 | 9/1900 | Luzatto. |
| 1,920,445 | 8/1933 | Thurlings _____ 107—8 |
| 2,104,197 | 1/1938 | Johansen _____ 100—145 |
| 2,271,063 | 1/1942 | Demattia. |
| 3,009,413 | 11/1961 | Alexander et al. _____ 100—218 |
| 3,030,876 | 4/1962 | Searles _____ 100—98 |
| 3,052,923 | 9/1962 | Sandor et al. _____ 18—20 |
| 3,168,058 | 2/1965 | Cunningham _____ 107—14 |
| 3,174,441 | 3/1965 | Lundell _____ 107—14 |
| 3,202,113 | 8/1965 | Love _____ 107—14 |
| 3,207,092 | 9/1965 | Lawrence _____ 107—14 |
| 3,213,784 | 10/1965 | Bornzin _____ 100—139 |

FOREIGN PATENTS

| | | |
|---|---|---|
| 504,019 | 6/1951 | Belgium. |
| 229,769 | 3/1925 | Great Britain. |
| 140,358 | 12/1961 | Russia. |

WALTER A. SCHEEL, *Primary Examiner.*

BILLY J. WILHITE, *Examiner.*